(No Model.)
C. C. WILSON.
VEHICLE PLATFORM GEAR.
No. 299,892. Patented June 3, 1884.
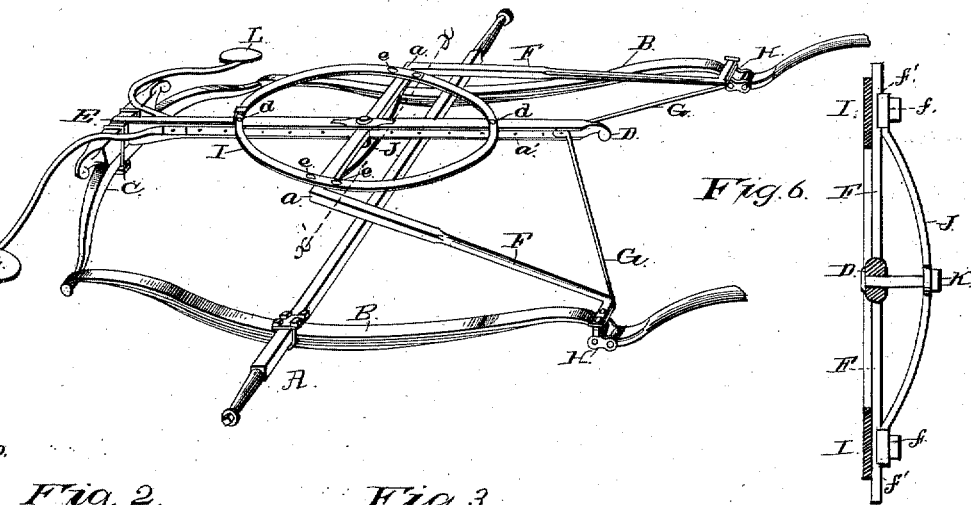
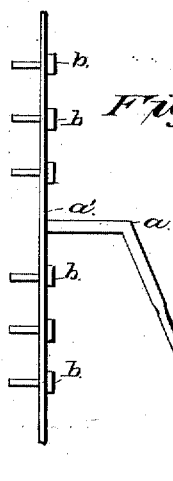
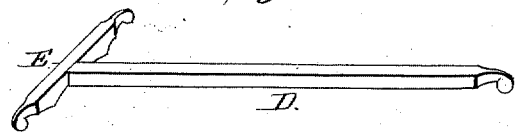
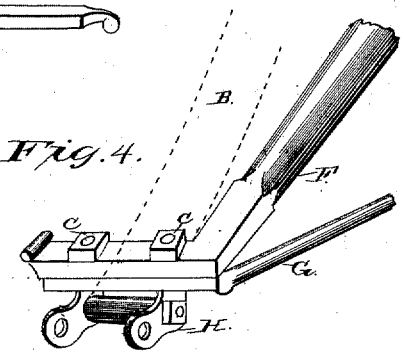
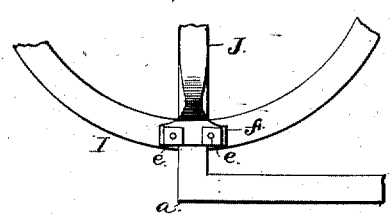
WITNESSES:
N. A. Clark
Jno. C. Schroeder
INVENTOR
Charles C. Wilson
by Geo Wedzer
atty

UNITED STATES PATENT OFFICE.

CHARLES C. WILSON, OF MANSFIELD, PENNSYLVANIA.

VEHICLE PLATFORM-GEAR.

SPECIFICATION forming part of Letters Patent No. 299,892, dated June 3, 1884.

Application filed February 23, 1884. (No model.)

*To all whom it may concern:*

Be it known that I, CHARLES C. WILSON, of Mansfield, in the county of Tioga and State of Pennsylvania, have invented a new and useful Improvement in Vehicle Platform-Gear; and I do hereby declare that the following is a full and exact description of the same, reference being had to the accompanying drawings, and to the letters of reference marked thereon.

My invention relates to an improvement in vehicle platform-gear; and my object is to increase their strength and durability, to reduce the cost of manufacture, and at the same time render them light, less cumbersome, and easier to put together, and less liable to settle or break at the center, as is a frequent occurrence in platform-gear.

With respect to these features the novelty of my invention consists in the construction and arrangement of the several parts of the gear, and in the manner in which they are connected and secured together, as will be hereinafter set out and described in detail.

For a better knowledge and understanding of my invention, attention is invited to the accompanying drawings, which, for convenience, illustrate the front gear only, and wherein Figure 1 is a perspective view of my improved platform-gear; Fig. 2, a detail view of one of the side arms and its attachment to the center piece; Fig. 3, a detail view of the center piece; Fig. 4, a detail view showing the manner in which the ends of the side arms and front braces are connected by the spring and shaft-couplings; Fig. 5, a detail view showing the attachment of the bottom brace and fifth-wheel to the side arms, and Fig. 6 a detail in section on the line $x$ $x$ of Fig. 1.

In the drawings similar letters of reference represent corresponding parts.

A denotes the axle, and B B the two side springs, secured thereto by the ordinary clips, and connecting at their rear ends with the ends of a cross-spring, C. Midway between the two side springs, and transversely across the axle, passes a center (preferably wooden) piece, D, which at its rear end is mortised into a head-block, E, resting upon and coupled to the cross-spring C. With the possible exception of the center piece above referred to, the remaining parts of this gear are made of iron.

F F represent the two side arms, which run from the front end of the side springs to the center piece, D. These side arms are bent inwardly at $a$ toward the center piece, but otherwise may be of any desirable and suitable shape, except at the point where they join said center piece, at which point they are forged into or otherwise provided with a flat extension, $a'$, which extends in opposite directions along the sides of said center piece, and is secured thereto by bolts $b$ or other suitable means. By thus attaching these side arms to the center piece the latter is given the full strength edgewise of the flat portions $a'$ of the former.

G G denote the front braces, which are secured in a suitable manner to the front end of the center piece, and run at nearly right angles from the same to the forward ends of the side springs, where they are bent outwardly and flattened and adjoin the ends of the side arms, F F, which are similarly bent and flattened. These flattened ends of the side arms and front braces are perforated to receive the two eyebolts of the spring and shaft-couplings H H, which secure said ends together by means of the nuts $c$ $c$. The fifth-wheel I is located at or about the center of the gear, and rests at four points upon the center piece D and side arms, F F, to which parts it is secured by bolts $d$, passing through the former, and by bolts $e$ $e$, which pass through it upon each side of the side arms at the points where it intersects, and through the broad and flattened ends of a bottom brace, J. This bottom brace is semi-elliptical in form, and extends across under the side arms, F F, from $a$ to $a$, and from points opposite upon the fifth-wheel. This bottom brace has broad and flattened ends $ff$, as above mentioned, and at each of the points where said ends meet the side arms fits into a notch, $f'$, which removes all strain from the bolts, and thereby adds strength and durability to the structure. A king-bolt, K, passes through the center piece, D, and bottom brace, J, and further unites said parts.

L L are the steps whose supporting-rods pass over the head-block E on the cross-spring and along each side of a portion of the center piece, to which parts they are securely fastened by bolts or other suitable means.

It will be apparent to the trade and others acquainted with the construction of vehicles that without the exercise of invention various changes may be made in the construction of this gear. For instance, instead of making the center piece, D, of wood, it may be made of iron and forged with the side arms; or the latter may each be forged with an equal section of the fifth-wheel, and then be secured to the sides of the wooden center piece, as described.

The gear herein described comprises but a few parts, which renders it lighter, cheaper in construction, and easier to put together, and yet more durable than others of its character.

What I claim, and desire to secure by Letters Patent, is—

1. In platform gear for vehicles, the combination of the center piece, D, and the side arms, F F, having the extensions $a'$, secured to the sides of said center piece, substantially as described.

2. In platform-gear for vehicles, the combination, with the center piece, of the side arms, front braces, and side springs, secured together at their forward ends by the shaft-couplings, substantially as described.

3. In platform-gear for vehicles, the combination of the center piece, side arms, fifth-wheel, and bottom brace with its ends fitting in notches in said side arms, substantially as and for the purpose set forth.

In testimony whereof I affix my signature in presence of two witnesses.

CHARLES C. WILSON.

Witnesses:
ORLANDO T. HAIGHT,
URIAH S. SNOVER.

Correction in Letters Patent No. 299,892.

It is hereby certified that in Letters Patent No. 299,892, granted June 3, 1884, upon the application of Charles C. Wilson, of Mansfield, Pennsylvania, for an improvement in "Vehicle Platform-Gear", an error was committed requiring correction as follows: The grant should read that the patent was issued to the said *Charles C. Wilson and Edward E. Van Dine*, of Troy, New York, assignor of one-half interest in said invention to make it conform to the files and records of the case in the Patent Office.

Signed, countersigned, and sealed this 17th day of June, A. D. 1884.

[SEAL.]
                 M. L. JOSLYN,
                  *Acting Secretary of the Interior.*

Countersigned:
 BENJ. BUTTERWORTH,
  *Commissioner of Patents.*